US008370465B2

(12) United States Patent
Shi et al.

(10) Patent No.: US 8,370,465 B2
(45) Date of Patent: *Feb. 5, 2013

(54) METHOD AND DEVICE FOR ESTABLISHING ROUTE

(75) Inventors: Guangyu Shi, Santa Clara, CA (US); Hao Gong, Shenzhen (CN); Jian Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,824

(22) Filed: Oct. 4, 2011

(65) Prior Publication Data

US 2012/0036232 A1 Feb. 9, 2012

Related U.S. Application Data

(60) Continuation of application No. 13/096,439, filed on Apr. 28, 2011, which is a division of application No. 12/365,564, filed on Feb. 4, 2009, now Pat. No. 7,991,858.

(30) Foreign Application Priority Data

Feb. 5, 2008 (CN) .......................... 2008 1 0065363

(51) Int. Cl.
*G06F 15/177* (2006.01)
(52) U.S. Cl. ........ 709/220; 709/223; 709/224; 709/225; 709/238; 709/242; 370/328; 370/338
(58) Field of Classification Search .......... 709/223–225, 709/238–242, 220; 370/328, 338
See application file for complete search history.

(56) References Cited

U.S. PATENT DOCUMENTS

| 7,103,040 B2 | 9/2006 | Aalbers et al. |
| 7,299,227 B2 | 11/2007 | Richardson |
| 7,684,352 B2 * | 3/2010 | Smith et al. .................. 370/255 |

(Continued)

FOREIGN PATENT DOCUMENTS

| CN | 1623311 A | 6/2005 |
| CN | 1731742 A | 2/2006 |

(Continued)

OTHER PUBLICATIONS

Xu et al: "HIERAS: a DHT based hierarchical P2P routing algorithm", Parallel Processing, 2003. Proceedings. 2003 International Conference on Oct. 6-9, 2003, Piscataway, NJ, USA, IEEE, Oct. 6, 2002, pp. 187-194, ISBN: 978-0-7695-2017-9.*

(Continued)

*Primary Examiner* — Wing F Chan
*Assistant Examiner* — Benjamin M Thieu
(74) *Attorney, Agent, or Firm* — Leydig, Voit & Mayer, Ltd.

(57) ABSTRACT

The embodiment of the present invention provides a method for establishing a route, which includes searching a target node by a node from a first level node group according to first level route information, returning to query a result or data saved by the target node if the target node is found, otherwise executing the following step; searching a target node by the node from a higher level node group according to higher level route information, returning to query a result or the data saved by the target node if the target node is found, otherwise repeating the step. Through the hierarchical communication system, most of the flows of daily service operations in the communication network are limited within a small region, thereby preventing from excessively occupying the band width of a backbone network being originally not wide enough.

7 Claims, 5 Drawing Sheets

U.S. PATENT DOCUMENTS

| | | | |
|---|---|---|---|
| 2002/0116526 | A1 | 8/2002 | Brown |
| 2003/0182421 | A1* | 9/2003 | Faybishenko et al. ......... 709/224 |
| 2004/0104841 | A1* | 6/2004 | Syrjarinne ............... 342/357.13 |
| 2004/0249970 | A1* | 12/2004 | Castro et al. .................. 709/238 |
| 2005/0198286 | A1 | 9/2005 | Xu et al. |
| 2008/0162410 | A1 | 7/2008 | Montpetit et al. |
| 2008/0225780 | A1* | 9/2008 | McCormick et al. ......... 370/328 |
| 2011/0010578 | A1* | 1/2011 | Agundez Dominguez et al. ................................ 714/4 |

FOREIGN PATENT DOCUMENTS

| | | |
|---|---|---|
| CN | 1939003 A | 3/2007 |
| EP | 1 248 441 A2 | 10/2002 |

OTHER PUBLICATIONS

United States Patent and Trademark Office, 1st Office Action in U.S. Appl. No. 13/096,439 (Dec. 9, 2011).

United States Patent and Trademark Office, 2nd Office Action in U.S. Appl. No. 13/096,439 (Feb. 8, 2012).

State Intellectual Property Office of the People's Republic of China, 1st Office Action in Chinese Application No. 201110067525.3 (Mar. 7, 2012).

Image File Wrapper in corresponding U.S. Appl. No. 13/096,439 (Sep. 29, 2011).

Image File Wrapper in corresponding U.S. Appl. No. 12/365,564 (Oct. 4, 2011).

1st Office Action in corresponding U.S. Appl. No. 12/365,564 (Oct. 1, 2010).

Written Opinion of the International Searching Authority and International Search Report in corresponding PCT Application No. PCT/CN2008/073009 (Feb. 26, 2009).

1st Office Action in corresponding Chinese Application No. 200810065363.8 (Oct. 9, 2010).

Guo et al., "Optimization Method in Content Addressable Network," Mini-Micro Systems, Dec. 2006, vol. 27, No. 12, Lab of Information Networks Department of Electronic Engineering and Information Science, University of Science and Technology of China, Hefei, China.

Jiping, "Research on Routing and Other Key Technologies in Peer-to-Peer Networks," submitted in partial fulfillment of the Requirements for the degree of Doctor of Philosophy in Communications and Information Systems, Apr. 2006, University of Science and Technology of China, Hefei, China.

Stoica et al., "Chord: a Scalable Peer-to-Peer Lookup Service for Internet Applications," Internet Citation http://www.lcs.mit.edu/publications/pubs/ps/MIT-LCS-TR-819.ps [retrieved on May 17, 2005].

Partial European Search Report in corresponding European Application No. 09152040.9 (Aug. 17, 2009).

Extended European Search Report in corresponding European Application No. 09152040.9 (Aug. 9, 2011).

Communication Report in corresponding European Application No. 09152040.9 (Aug. 30, 2011).

Artigas et al., "Cyclone: a Novel Design Schema for Hierarchical DHTs," International Conference on Peer-to-Peer Computing, 2005, Institute of Electrical and Electronic Engineering, Tarragona, Spain.

Xu et al., "HIERAS: A DHT Based Hierarchical P2P Routing Algorithm," International Conference on Parallel Processing, Department of Electrical and Computer Engineering and Computer Science, 2003, Institute of Electrical and Electronic Engineering, Cincinnati, Ohio.

Final Office Action in Related U.S. Appl. No. 13/096,439 (Jul. 13, 2012).

Artigas et al., "Cyclone: a Novel Design Schema for Hierarchical DHTs," Proceedings of the Fifth IEEE International Conference on Peer-to-Peer Computing, 2005, IEEE, Washington, DC.

\* cited by examiner

Build up a hierarchical DHT network by a node based on a geographical position relation according to an Id of the node, form and maintain DHT route information of each layer ⟋301

Register all the nodes in the network and make all the P2P nodes join a highest level whole scale DHT network, form and maintain highest level whole DHT route information. ⟋302

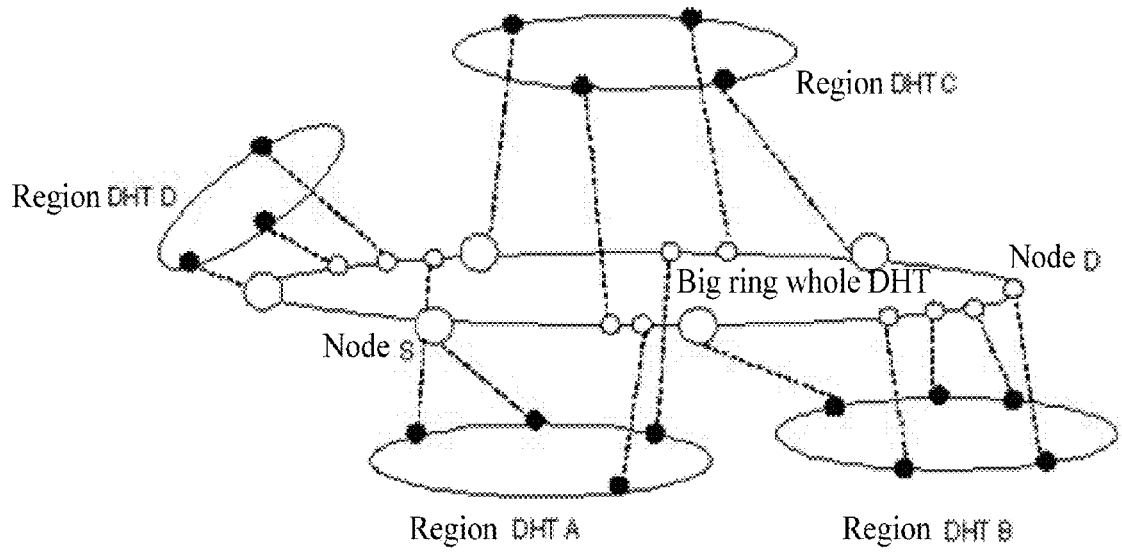

Search for a target node from a first level node group by a node (for example, a P2P node) according to first level route information, return a search result or data saved by the target node if the target node is found, otherwise execute Step 202 ~201

Search for the target node from a higher level node group by the node according to higher level route information, return a search result or the data saved by the target node if the target node is found, otherwise repeat Step 202 ~202

FIG. 6

METHOD AND DEVICE FOR ESTABLISHING ROUTE

CROSS-REFERENCE TO RELATED APPLICATIONS

This application is a continuation of U.S. patent application Ser. No. 13/096,439, filed on Apr. 28, 2011, which is a divisional application of U.S. patent application Ser. No. 12/365,564, filed on Feb. 4, 2009. The U.S. patent application Ser. No. 12/365,564 claims priority to Chinese Patent Application No. 200810065363.8, filed on Feb. 5, 2008. The aforementioned patent applications are hereby incorporated by reference in their entireties.

FIELD OF TECHNOLOGY

The present invention relates to an electronic communication technical field, and more particularly, to a method and device for establishing a route.

BACKGROUND

Being different from a conventional client/server mode, there is not a central server node in a peer-to-peer (P2P) network. Each node may be used as the server to provide services for other nodes, and may also enjoy the services provided by other node serving as the server. Therefore, in the P2P network, all nodes are equal in position, and each node is referred to as a peer.

The P2P network is a self-organized configuration network system. In the network, the behaviors of joining the network or exiting the network performed by each Peer are random. Similarly, in the network, for the communication between each two Peers, after a relevant Key is found according to logical distributed hash table (DHT), a lower layer physical link is randomly selected to perform the route connecting communication. In this manner, when the number of the Peers or the communication amount in the network gradually increases, the flow in the whole network is unorganized and out of order, and a great amount of data interaction is performed through a whole network search or operation. Finally, a backbone network with an insufficient bandwidth source and an inter-domain link are seriously consumed, thereby generating congestion.

SUMMARY

The embodiment of the present invention provides a method and device for establishing a route, a method and device for constructing a node Id, and communication network, so as to alleviate the congestion of the backbone network.

The embodiment of the present invention provides a method for constructing a node Id, which includes the following steps.

Geographical position information of the node is acquired.

A hash space of the node Id is determined by adopting a strip division method according to the geographical position information of the node.

One hash value is randomly selected from the hash space, and the node Id is constructed by combining the hash value with other attribute information of the node.

The present invention further provides a device for constructing a node Id, which includes an acquiring unit, a determining unit, and a constructing unit.

The acquiring unit is adapted to acquire geographical position information of a node.

The determining unit is adapted to determine a hash space of the node Id by adopting a strip division method according to the geographical position information of the node.

The constructing unit is adapted to randomly select one hash value from the hash space, and construct the node Id by combining the hash value with other attribute information of the node.

The present invention further provides a communication network, which includes a first level node group and a second level node group. The first level node group includes a first node and a second node, and the second level node group includes a third node. The first node and the second node are the nodes with an Id of the same first geographical position information, and the third node includes an Id of second geographical position information. A regional scope displayed by the second geographical position information is larger than a regional scope displayed by the first geographical position information. The nodes in the first level node group and the nodes in the second level node group respectively maintain route information of each node group. The first node includes the route information of the first level node group and the second level node group, and the second node includes the route information of the first level node group and the second level node group.

The present invention further provides a communication network, which includes a first level node group and a second level node group. The first level node group includes a first node and a second node, and the second level node group includes a third node. The nodes in the first level node group and the nodes in the second level node group respectively maintain route information of each node group. A regional scope covered by the second level node group is larger than a regional scope covered by the first level node group. The second level node group includes the first level node group, the first node includes the route information of the first level node group and the second level node group, and the second node includes the route information of the first level node group and the second level node group.

The present invention further provides a communication network, which includes a first level node group and a second level node group. The first level node group includes a first node and a second node, and the second level node group includes a third node. The nodes in the first level node group and the nodes in the second level node group respectively maintain route information of each node group. The first node includes the route information of the first level node group and the second level node group, and the second node includes the route information of the first level node group and second level node group.

The present invention further provides a communication network, which includes a first level home subscriber server (HSS) node group and a second level HSS node group. The first level HSS node group includes a first HSS node and a second HSS node, and the second level HSS node group includes a third HSS node. The HSS nodes in the first level HSS node group and the HSS nodes in the second level HSS node group respectively maintain route information of each node group. The first HSS node includes the route information of the first level HSS node group and the second level HSS node group, and the second HSS node includes the route information of the first level HSS node group and the second level HSS node group.

The present invention further provides a communication network, which includes a first level HSS node group and a second level HSS node group. The first level HSS node group includes a first HSS node and a second HSS node, and the second level HSS node group includes a third HSS node. The HSS nodes in the first level HSS node group and the HSS nodes in the second level HSS node group respectively maintain route information of each node group. A regional scope covered by the second level HSS node group is larger than a regional scope covered by the first level HSS node group. The second level HSS node group includes the first level HSS node group, the first HSS node includes the route information of the first level HSS node group and the second level HSS node group, and the second HSS node includes the route information of the first level HSS node group and the second level HSS node group.

The present invention further provides a communication network, which includes a first level HSS node group and a second level HSS node group. The first level HSS node group includes a first HSS node and a second HSS node, and the second level HSS node group includes a third HSS node. The first HSS node and the second HSS node are the nodes with Id of the same first geographical position information, and the third HSS node includes an Id of second geographical position information. A regional scope displayed by the second geographical position information is larger than a regional scope displayed by the first geographical position information. The HSS nodes in the first level HSS node group and the HSS nodes in the second level HSS node group respectively maintain route information of each node group. The first HSS node includes the route information of the first level HSS node group and the second level HSS node group, and the second HSS node includes the route information of the first level HSS node group and the second level HSS node group.

The present invention further provides a method for establishing a route, which includes the following steps.

A node searches for a target node from a first level node group according to first level route information. If the target node is found, the node returns a search result or data saved by the target node. If the target node is not found, the following step is executed.

The node searches for a target node from a higher level node group according to higher level route information. If the target node is found, the node returns a search result or data saved by the target node. If the target node is not found, this step is repeated.

The present invention further provides a method for constructing a hierarchical DHT network, which includes the following steps.

A node builds up a hierarchical DHT network based on a geographical position relation according to an Id of the node, and forms and maintains DHT route information of each layer.

All nodes in the network register and join a highest level whole scale DHT network, and forms and maintains highest level whole DHT network route information.

The present invention further provides a communication apparatus, which includes a device for establishing a route, in which the device for establishing the route includes a receiving unit, a route searching unit, and a transmitting unit.

The receiving unit is adapted to receive target node information required to be searched for.

The route searching unit is adapted to search for route information of a target node in a sequence from lower level route information to higher level route information according to the target node information, until the route information of the target node is found.

The transmitting unit is adapted to transmit information to the target node according to the found route information of the target node.

The present invention further provides a communication network system, which includes at least one node, in which the node includes a receiving unit, a route searching unit, and a transmitting unit.

The receiving unit is adapted to receive target node information required to be searched for.

The route searching unit is adapted to search for route information of a target node in a sequence from lower level route information to higher level route information according to the target node information, until the route information of the target node is found.

The transmitting unit is adapted to transmit information to the target node according to the found route information of the target node.

Through the hierarchical communication system, most of the flows of daily service operations in the communication network are limited within a small region, thereby preventing from excessive occupation of the bandwidth of a backbone network which is originally not wide enough.

BRIEF DESCRIPTION OF THE DRAWINGS

FIG. 5 is a schematic view of the two-layer DHT network according to the embodiment of the present invention;

FIG. 6 is a schematic flow chart of a method for establishing a route according to the embodiment of the present invention.

DETAILED DESCRIPTION

In the following, a detailed description of the technical solution of the present invention is given with the accompanying drawings.

Figure 1:
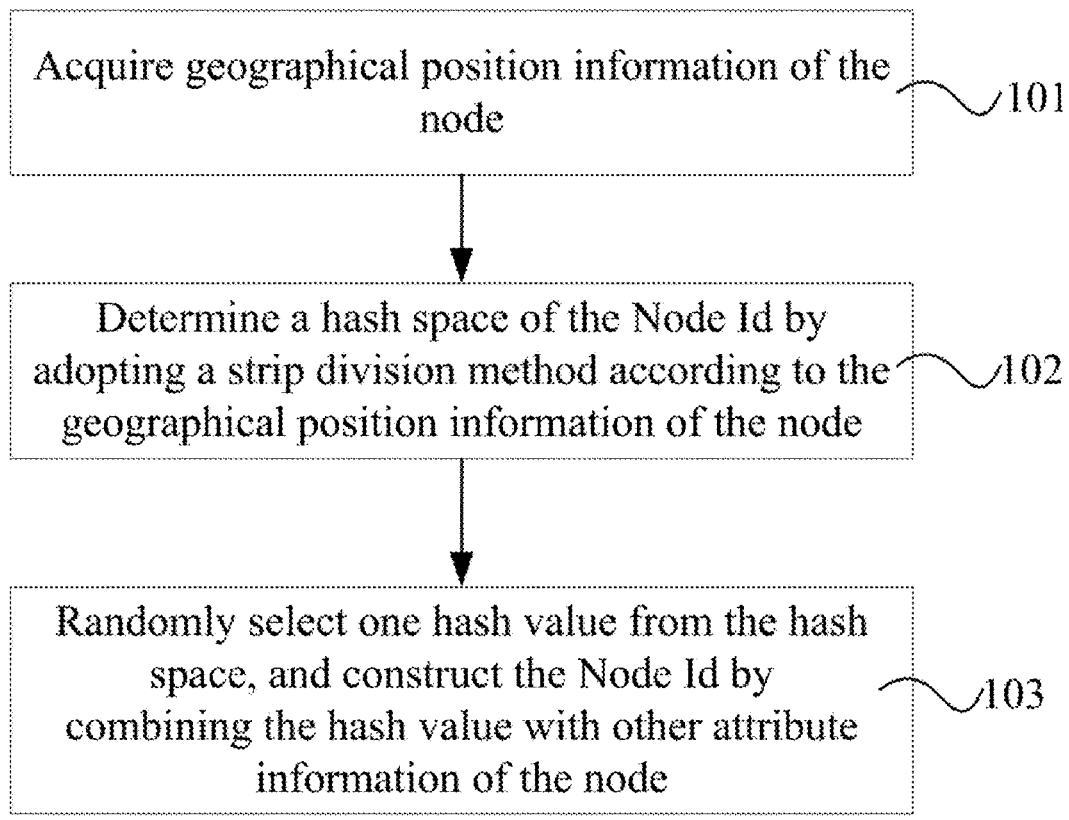
FIG. 1 is a schematic flow chart of a method for constructing a node Id according to an embodiment of the present invention.

Referring to FIG. 1, the embodiment of the present invention provides a method for constructing a node Id, which includes the following steps.

Step 101: Geographical position information of a node is acquired.

When joining a network, the node usually discloses its geographical position information, and the geographical position information of the node may be acquired by a collecting manner, or may be acquired by an actively acquiring manner.

Step 102: A hash space of the node Id is determined by adopting a strip division method according to the geographical position information of the node.

Step 103: One hash value is randomly selected from the hash space, and the node Id (for example, the Node Id) is constructed by combining the hash value with other attribute information of the node.

The hash value serves as a part of the node Id (for example, a prefix, a suffix or a certain key field).

The geographical position information is geographical region information, such as, Shenzhen city, Guangzhou city, Guangdong province of China, and so on.

Figure 2:
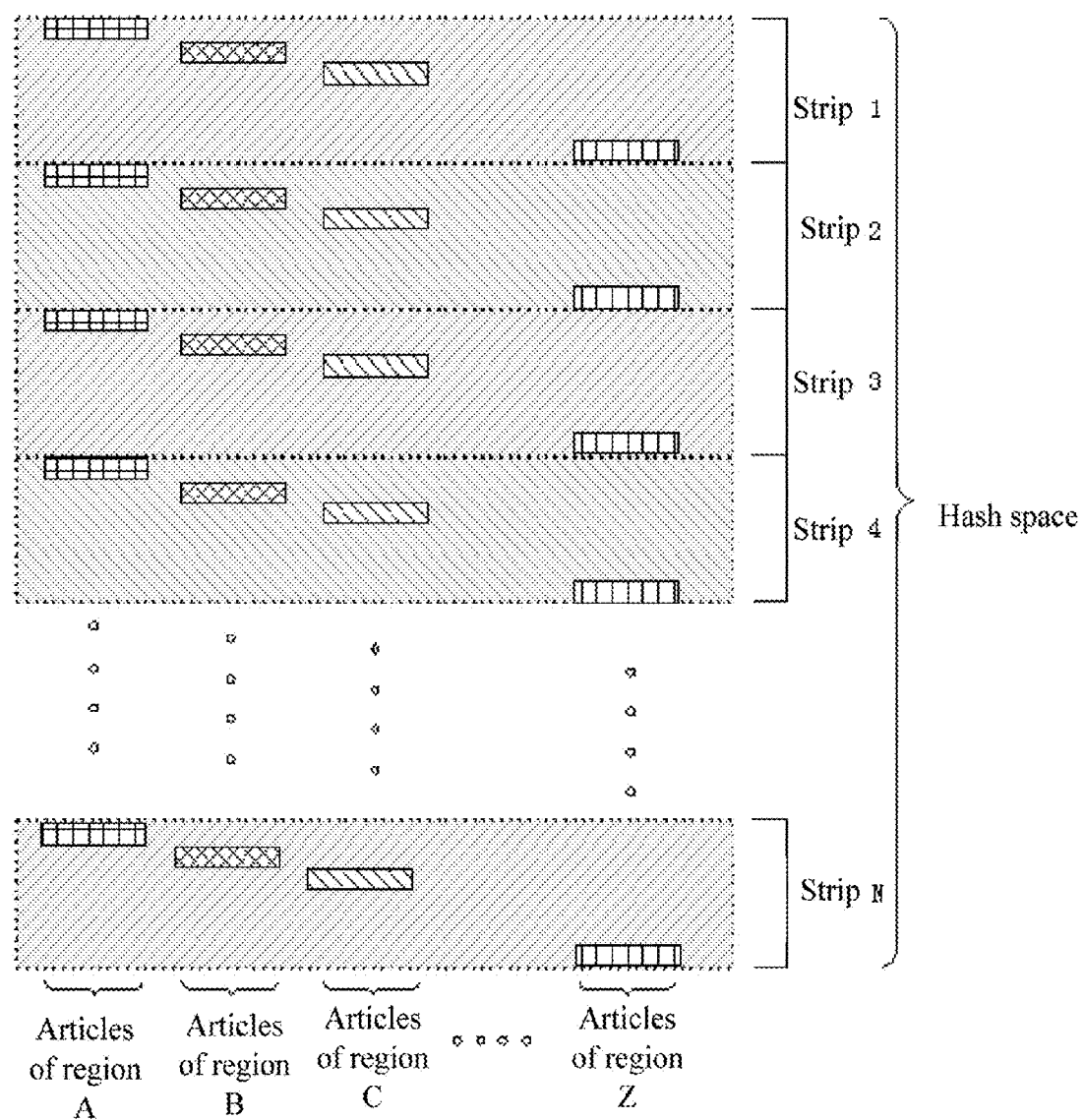
FIG. 2 is a schematic view of region information divided by strips according to the embodiment of the present invention.

Referring to FIG. 2, in Steps 102 and 103, particularly, a strip division method may be adopted for selecting the Id. Each region is respectively an article collection of one filling manner in the figure, the whole hash space may be divided into N strips, and each strip is divided into z articles, where z is the number of the regions. The node Peer of each region randomly selects one hash value from the articles of the region thereof as the prefix or suffix or certain key field of its own Id, and construct the node Id by combining the hash value with other attribute information of the node.

The other attribute information of the node may be a name of the node, an attribute of node IP, a latitude of the node or a longitude of the node.

The other attribute of the node may also be a combination of two of the name of the node, the attribute of the node IP, the latitude of the node and the longitude of the node.

The other attribute of the node may also be a combination of three of the name of the node, the attribute of the node IP, the latitude of the node and the longitude of the node.

It may be known from the above-mentioned that a node Id assignment mechanism, with which the hash space is averagely divided according to the geographical region position, is well achieved through the method, and the nodes in a large region are approximately averagely distributed into each article by the strips, and the larger the region is, the more scattered the distribution is.

For example, in an Id setting rule, Shenzhen city belongs to the region B, so that when one node located in Shenzhen city joins the network, the node randomly selects one strip from the hash space, then finds a hash value scope article belonging to the region B from the strip, randomly selects one hash value from the hash scope as the prefix (or suffix or certain key field) of the Id, and constructs the node Id by combining the hash value with other attribute information of the node.

It may be known that the detailed geographical position of the node may be deduced with the certain key field in one node Id and the strip division rule through such one strip division mechanism for selecting the Id so as to obtain subscriber position information from the node Id.

In the embodiment of the present invention, the process of constructing its own Id of the node may be finished by the node own, or may be uniformly finished by a central server, and then the node requests distribution of the central server.

The embodiment of the present invention further provides a device for constructing the node Id. Based on the realization of the above method, the device may realize the above-mentioned method for constructing the node Id. The device may be disposed on the node, and may also be disposed on the server or other telecommunication devices.

Figures 3, 4:
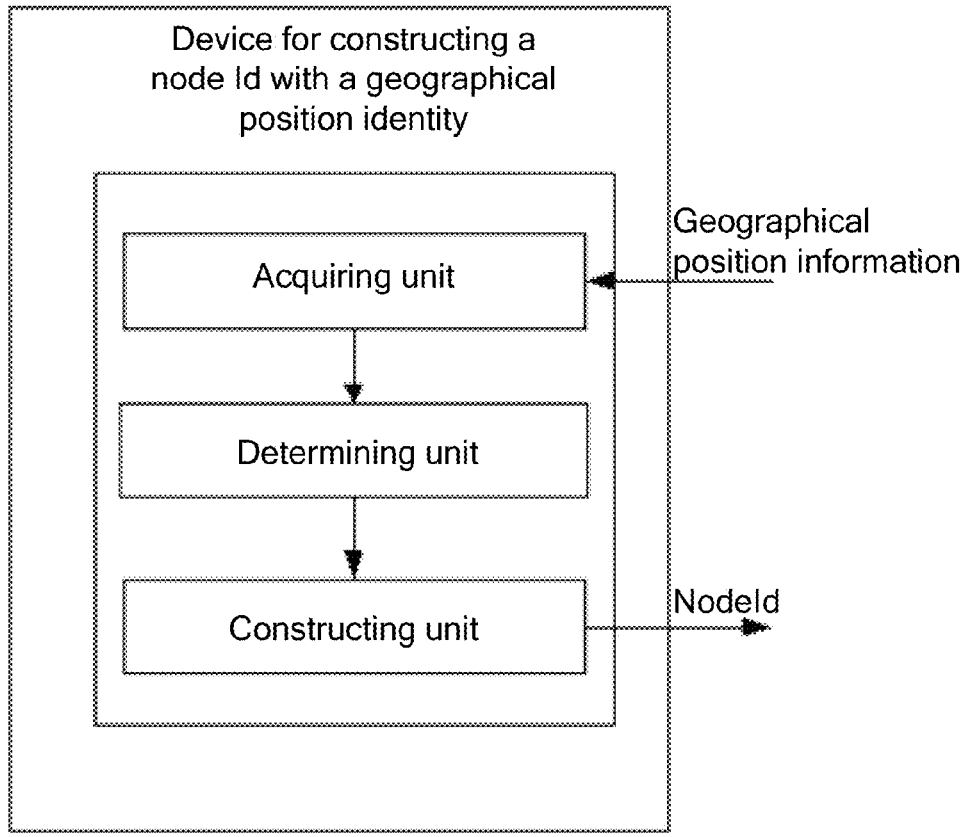
FIG. 3 is a schematic view of a device for constructing a node Id according to the embodiment of the present invention.
FIG. 4 is a schematic flow chart of a method for constructing a two-layer DHT network according to the embodiment of the present invention.

Referring to FIG. 3, a device for constructing the node Id, which is realized based on the above method, includes an acquiring unit, a determining unit and a constructing unit.

The acquiring unit is adapted to acquire geographical position information of the node.

The determining unit is adapted to determine a hash space of the node Id by adopting a strip division method according to the geographical position information of the node.

The constructing unit is adapted to randomly select one hash value from the hash space, and construct the node Id by combining the hash value with other attribute information of the node.

The embodiment of the present invention further provides a communication network, which is realized based on the above method, and includes a first level node group and a second level node group, in which the first level node group includes a first node and a second node, and the second level node group includes a third node.

The first node and the second node are the nodes with the Id of the same first geographical position information, which may be the prefix, the suffix or certain key field.

The third node includes an Id of second geographical position information, and a regional scope displayed by the second geographical position information is larger than a regional scope displayed by the first geographical position information.

The nodes in the first level node group and the nodes in the second level node group respectively maintain route information of each node group.

The first node and the second node include the route information of the first level node group and the second level node group.

The embodiment of the present invention further provides a communication network, which is realized based on the above method, and includes a first level node group and a second level node group. The first level node group includes a first node and a second node, and the second level node group includes a third node.

The nodes in the first level node group and the nodes in the second level node group respectively maintain route information of each node group. A regional scope covered by the second level node group is larger than a regional scope covered by the first level node group. The second level node group includes the first level node group, and the first node and the second node include the route information of the first level node group and the second level node group.

The embodiment of the present invention further provides a communication network, which is realized based on the above method, and includes a first level node group and a second level node group. The first level node group includes a first node and a second node, and the second level node group includes a third node. The nodes in the first level node group and the nodes in the second level node group respectively maintain route information of each node group, and the first node and the second node include the route information of the first level node group and the second level node group.

The embodiment of the present invention further provides a communication network, which is realized based on the above method, and includes a first level HSS node group and a second level HSS node group. The first level HSS node group includes a first HSS node and a second HSS node, and the second level HSS node group includes a third HSS node. The HSS nodes in the first level HSS node group and the HSS nodes in the second level HSS node group respectively maintain route information of each node group. The first HSS node and the second HSS node include the route information of the first level HSS node group and the second level HSS node group.

The embodiment of the present invention further provides a communication network, which is realized based on the above method, and includes a first level HSS node group and a second level HSS node group. The first level HSS node group includes a first HSS node and a second HSS node, and the second level HSS node group includes a third HSS node. The HSS nodes in the first level HSS node group and the HSS nodeS in the second level HSS node group respectively maintain route information of each node group. A regional scope covered by the second level HSS node group is larger than a regional scope covered by the first level HSS node group. The second level HSS node group includes the first level HSS node group, and the first HSS node and the second HSS node include the route information of the first level HSS node group and the second level HSS node group.

The embodiment of the present invention further provides a communication network, which is realized based on the above method, and includes a first level HSS node group and a second level HSS node group. The first level HSS node group includes a first HSS node and a second HSS node, and the second level HSS node group includes a third HSS node. The first HSS node and the second HSS node are the nodes with an Id of the same first geographical position information, and the third HSS node includes an Id of second geographical position information. A regional scope displayed by the second geographical position information is larger than a regional scope displayed by the first geographical position information. The HSS nodes in the first level HSS node group and the HSS nodes in the second level HSS node group respectively maintain route information of each node group. The first HSS node and the second HSS node include the route information of the first level HSS node group and the second level HSS node group.

The embodiment of the present invention further provides a method for establishing a route, which may be finished by the node and includes the following steps.

Step 201: A node searches for a target node from a first level node group according to first level route information, and returns a search result or data saved by the target node if the target node is found. Step 202 is executed if the target node is not found.

Step 202: The node searches for the target node from a higher level node group according to higher level route information, and returns a search result or data saved by the target node if the target node is found. Step 202 is repeated if the target node is not found.

For example, in the telecommunication system, the first level node group forms the node Id with the geographical regional scope identity according to the geographical position information of the subscriber, for example, in a home subscriber server (HSS) of an mobile IP multimedia subsystem (IMS), the hash value of the domain name in an instant messaging private user identity (IMPI) is served as the key of the HSS node Id. Then, the node Ids are collected together so as to form the hierarchical HSS node group network, for example, a city level HSS network or a province level HSS network. Each joined node maintains the routing table information of the each layer network joined.

The second level node group registers all the subscribers in the whole network and makes the subscribers join the higher level node group network, for example, a country level HSS network. Each node maintains a whole network highest level routing table information, that is, the first level routing table information also includes the second level route information.

In the telecommunication network, most data access modes have a localization feature, for example, in a traffic model, a proportion of local calling is higher than a proportion of toll and roaming calling. By adopting the embodiment of the present invention, the local calling may be finished in Step 201, only the related data operations of the toll and roaming calling are executed in Step 202. In Step 201, only the local network resource is used, and in Step 202, the resource of the toll backbone network connected to the local network is used. Therefore, in the embodiment of the present invention, under this situation, the resource consumption of the backbone network is saved as compared with a common DHT.

The node may be the Peer node, and the node group may be the DHT network. According to the particular network programming and the geographical position information, the node group may also be divided into three, four or more layers.

The flowing embodiment takes two-layer for example. Referring to FIG. 4, the method for constructing a two-layer DHT network of the embodiment of the present invention includes the following step.

Step 301: A node builds up the hierarchical DHT network based on a geographical position relation according to an Id of the node, forms and maintains each layer of DHT route information (may be the routing table).

According to a geographical information prefix (or the suffix or certain key field) of the node Id, the nodes with the same geographical key field are registered and collected together so as to finally form the hierarchical DHT network based on the geographical position relation, and each node respectively maintains the node routing table information of each layer of the DHT network.

The Peer nodes of each layer of the DHT network are the nodes with the Id having the same geographic scope, for example, the nodes in the Shenzhen level DHT network have the Id including the key filed of Shenzhen. In the embodiment of the present invention, the scale of the each layer of the DHT network may be different, and the particular scale may be set according to the network programming demand. For example, according to the city level scale, the Peer nodes belonging to the same city are collected together to one layer of the DHT network, for example, the nodes with the Id having the key field of Shenzhen are collected together so as to form one layer of the DHT network of the Shenzhen region, and the nodes in the layer of the DHT network maintain one DHT routing table of the layer of the network node. According to the province level scale, the Peer nodes of the same province are collected to one layer of the DHT network, for example, the nodes with the Id having the key field of Guangdong are collected together, so as to form one layer of the DHT network of the Guangdong region, and a corresponding province level DHT routing table is constructed.

Referring to FIG. 5, the nodes in each region A, B, C and D form DHT region rings, i.e. one layer of the DHT network, according to the geographical information prefix (may also be the suffix or certain key field) in its own Id.

Similarly, the multi-layer DHT network is constructed based on the geographical position relation according to the geographical position information of the node. For example, a site level DHT network is formed first according to a site/rack relation, then a city level scale DHT network is formed according to a city level relation, and finally a province level scale DHT network is formed on the city level DHT network according to a province level relation. The more layers of the DHT network are divided, the better the balancing and localizing effect of the network flow is. However, the more layers may also result in more routing table information required to be maintained by each Peer node, and thus more cost is required. The particular number of the layers of the DHT may be determined according to the system flow project demand and the cost loading index.

Referring to FIG. 4, the method for constructing the two-layer DHT network of the embodiment of the present invention further includes the following step.

Step 302: All the nodes in the network are registered and joined a highest level whole DHT network, forms and maintains the highest level whole DHT network route information such as the routing table.

The highest level DHT network, i.e., the whole DHT network, makes the Peer nodes register the whole scope and join the higher level DHT network, so that the whole network node route may be realized.

Referring to FIG. 6, the embodiment of the present invention further provides a method for establishing the route, which includes the following steps.

Step 201: A node (for example, the Peer node) searches for a target node from a first level node group according to first level route information, and returns a search result or data saved by the target node if the target node is found, and Step 202 is executed if the target node is not found.

Step 202: The node searches for the target node from a higher level node group according to higher level route information, and returns a search result or the data saved by the target node if the target node is found, and Step 202 is repeated if the target node is not found.

Each Peer node maintains N level route information, in which N is a particular number of the node groups (for example, the constructed DHT network). The N level route information (for example, the routing table) includes the route information of the N node groups which the node belongs to. When executing a daily service operation, firstly the node searches for the target node from the route information of its own level; when the information of the target node is not in the route information of its own level, the node searches for the target node from the higher level route information, until finally finds the target node from the highest whole network route information.

In Steps 201 and 202, by grouping the nodes, the hierarchical DHT network is formed, and a hierarchical index route searching mechanism is realized. For example, referring to FIG. 1, when a certain node S in a region DHT A requires to search for a certain node D in the network, firstly, the node S searches for the node in the routing table of the region DHT A; if the target node is in the region, the node S quickly finds the target node. If the node S finds that the node is not in the routing table of the region, the node S immediately forwards the searching request command to a big ring whole DHT network. At this time, on receiving the searching request, a node D in a region DHT B responds to the request information, and finally finishes the searching operation.

Through such one hierarchical DHT system, the number of the Peers in the P2P network is quite large. When an interaction among the Peers is quite violent, most flows of the daily service operations in the P2P network is limited within the local DHT, thereby preventing from excessive occupation of the bandwidth of the backbone network which is originally not wide enough. In addition, in the system of the embodiment of the present invention, each DHT Peer has multi-roles, and it is determined whether to search in the whole level DHT network or in each region level DHT network during the first query, thereby achieving the purpose of searching for only once for the target node.

Figure 7:
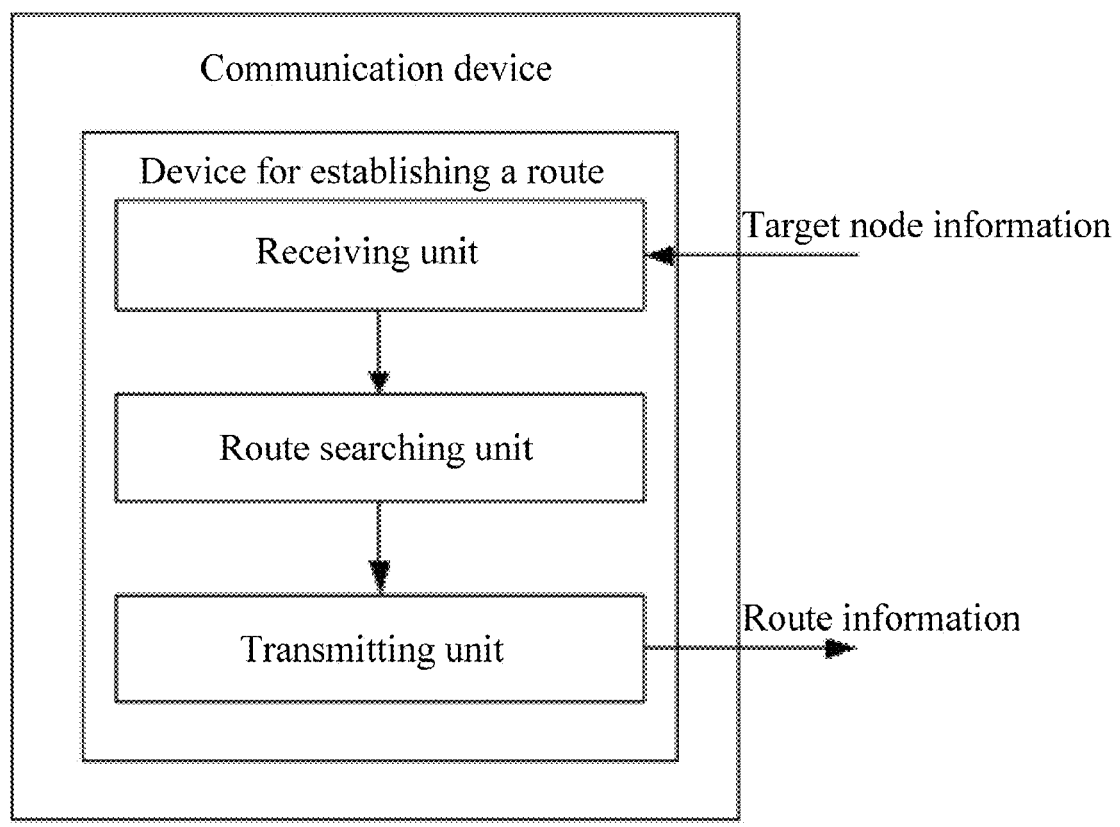
FIG. 7 is a schematic view of a device for establishing a route according to the embodiment of the present invention.

Corresponding to the method for establishing the route of the embodiment of the present invention, the embodiment of the present invention further provides a communication apparatus, which includes a device for establishing the route and is realized based on the above method. Referring to FIG. 7, it is a schematic structural view of the device. The device may be disposed on the node (for example, the Peer node), the server, or other communication apparatus. The device includes a receiving unit, a route searching unit and a transmitting unit. The receiving unit is adapted to receive target node information required to be searched, for example, an index value.

The route searching unit is adapted to search for route information of a target node in a sequence from lower level route information to higher level route information according to the target node information until the route information of the target node is found.

The transmitting unit is adapted to transmit information to the target node according to the found route information of the target node.

The lower level route information is the routing table information maintained by the nodes in the first level node group in the hierarchical network.

The higher level route information is the routing table information maintained by the nodes in the second level node group or the node group above the second level node group in the hierarchical network.

When executing the service operation, the node searches for a target index from the lower level routing table. When the index data is not in its own lower level DHT, the node searches for the target index in the higher level routing table until searching in the highest level DHT routing table.

The embodiment of the present invention provides a communication network system, which is realized based on the above method, and includes at least one node, in which the node includes a receiving unit, a route searching unit and a transmitting unit.

The receiving unit is adapted to receive target node information required to be searched.

The route searching unit is adapted to search for route information of a target node in a sequence from lower level route information to higher level route information according to the target node information, until route information of the target node is found.

The transmitting unit is adapted to transmit the information to the target node according to the found route information of the target node.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A communication network, comprising:
   a first level node group; and
   a second level node group;
   wherein:
   the first level node group comprises a first node and a second node;
   the second level node group comprises a third node;
   the first node and the second node comprises route information of the first level node group and the second level node group and IDs of first geographical position information;
   the third node comprises an ID of second geographical position information; and
   a regional scope displayed by the second geographical position information is larger than a regional scope displayed by the first geographical position information, wherein the IDs of the first geographical position information are formed by first node ID constructing devices that are associated with the first and second node respectively, and the ID of the second geographical position information are formed by an node ID constructing device that is associated with the third node;

each of the first node ID constructing devices and the node ID constructing device comprises:

an acquiring unit adapted to acquire geographical position information of a node which each of the first node ID constructing devices and the node ID constructing device associates with;

a determining unit adapted to determine a hash space of a node ID by adopting a strip division method according to the geographical position information of the node; and a constructing unit adapted to randomly select one hash value from the hash space, and construct an ID of geographical position information of the node by combining the hash value with other attribute information of the node.

2. The network according to claim 1, wherein:

the first level node group is a home subscriber server (HSS) node group, and the second level node group is an HSS node group; and the first node, the second node and the third node are HSS nodes.

3. The network according to claim 1, wherein:

a regional scope covered by the second level node group is larger than a regional scope covered by the first level node group.

4. The network according to claim 3, wherein:

the first level node group is a home subscriber server (HSS) node group, and the second level node group is an HSS node group; and the first node, the second node and the third node are HSS nodes.

5. The network according to claim 1, wherein the determining unit is adapted to divide the hash space into N strips, and divide each strip into z articles, wherein each article corresponds to one of z geographical positions.

6. The network according to claim 1, wherein the other attribute information comprises at least one of a name of the node, an IP attribute of the node, a latitude of the node, and a longitude of the node.

7. The network according to claim 1, wherein the hash value serves as one of a prefix, a suffix, and a key field of the node ID.

* * * * *